(12) United States Patent
Young

(10) Patent No.: US 11,879,237 B2
(45) Date of Patent: Jan. 23, 2024

(54) RAINWATER HARVESTING SYSTEM FOR EMERGENCY SHELTER

(71) Applicant: Rodney Young, Hull, MA (US)

(72) Inventor: Rodney Young, Hull, MA (US)

(*) Notice: Subject to any disclaimer, the term of this patent is extended or adjusted under 35 U.S.C. 154(b) by 812 days.

(21) Appl. No.: 16/943,543

(22) Filed: Jul. 30, 2020

(65) Prior Publication Data
US 2022/0034072 A1 Feb. 3, 2022

(51) Int. Cl.
*E03B 3/02* (2006.01)
*E04H 15/26* (2006.01)
*E04H 15/02* (2006.01)
*E04D 13/04* (2006.01)
*E04H 15/60* (2006.01)
*E04H 15/54* (2006.01)
*E04H 15/64* (2006.01)

(52) U.S. Cl.
CPC .......... *E03B 3/02* (2013.01); *E04D 13/0481* (2013.01); *E04H 15/02* (2013.01); *E04H 15/54* (2013.01); *E04H 15/60* (2013.01); *E04H 15/646* (2013.01)

(58) Field of Classification Search
CPC ........ A45B 2019/007; A45B 2019/008; A45B 2023/0018; E04H 15/26; E03B 3/02
See application file for complete search history.

(56) References Cited

U.S. PATENT DOCUMENTS

| | | | | |
|---|---|---|---|---|
| 1,543,134 | A * | 6/1925 | Todd | E04H 15/26 52/36.2 |
| 8,807,153 | B2 * | 8/2014 | Dalo | E04H 15/26 135/98 |
| 10,190,292 | B1 * | 1/2019 | Shackelford | E03B 3/03 |
| 10,888,144 | B2 * | 1/2021 | Pikulski | A45B 19/00 |
| 2009/0199886 | A1 * | 8/2009 | Dalo | E04H 15/26 135/123 |
| 2011/0132823 | A1 * | 6/2011 | Brown | E04H 15/28 210/170.03 |
| 2014/0352842 | A1 * | 12/2014 | McEvilly | E04H 15/04 141/69 |
| 2020/0270893 | A1 * | 8/2020 | Aloumanis | E04H 15/02 |

FOREIGN PATENT DOCUMENTS

| | | | |
|---|---|---|---|
| DE | 2808635 A1 * | 9/1979 | |
| WO | WO-2020019016 A1 * | 1/2020 | |

* cited by examiner

Primary Examiner — Noah Chandler Hawk
(74) Attorney, Agent, or Firm — Fish & Richardson P.C.

(57) ABSTRACT

A rainwater harvesting apparatus and system for an emergency shelter includes a platform defining an aperture. A threaded fastener is inserted through the aperture and is rotatable through the aperture. A planar panel assembly is fastened to the platform by the threaded fastener. The planar panel assembly is configured to move on the threaded fastener along a longitudinal axis of the threaded fastener as the threaded fastener is rotated through the aperture in the platform. A canopy is secured to the planar panel assembly, such that a segment of the canopy moves together with the planar panel assembly along the longitudinal axis of the threaded fastener as the planar panel assembly moves on the threaded fastener.

18 Claims, 14 Drawing Sheets

RAINWATER HARVESTING SYSTEM FOR EMERGENCY SHELTER

TECHNICAL FIELD

This description relates generally to an emergency shelter, for example, to a rainwater harvesting system for an emergency shelter.

BACKGROUND

Natural disasters, such as earthquakes, tidal waves, tornado, hurricanes or flooding can displace large numbers of people. Moreover, illnesses, such as COVID-19, can spread rapidly by respiratory droplets. The spread of virus-borne or bacterial disease is more rapid when people are in close contact with one another. Widespread pandemics can result in economic distress, causing a lack of adequate housing. Conventional housing, built for non-pandemic conditions, can lack features for social-distancing, causing people to shelter close together without adequate isolation.

SUMMARY

A rainwater harvesting apparatus and system for an emergency shelter is disclosed. In some embodiments, the apparatus includes a platform defining an aperture. A threaded fastener is inserted through the aperture and is rotatable through the aperture. A planar panel assembly is fastened to the platform by the threaded fastener. The planar panel assembly is configured to move on the threaded fastener along a longitudinal axis of the threaded fastener as the threaded fastener is rotated through the aperture in the platform. A canopy is secured to the planar panel assembly, such that a segment of the canopy moves together with the planar panel assembly along the longitudinal axis of the threaded fastener as the planar panel assembly moves on the threaded fastener.

In some embodiments, multiple poles support the canopy. A first end of each pole of the multiple poles is secured to the canopy.

In some embodiments, multiple struts are supported in a pyramidal arrangement by the multiple poles. A first end of each strut of the multiple struts is secured to the first pole end of a respective pole of the multiple poles.

In some embodiments, the apparatus further includes multiple straps. Each strap of the multiple straps secures a second end of a respective strut of the multiple struts to the platform. The second strut end is distal to the first strut end. The multiple straps are made from at least one of nylon, fabric, plastic, or hemp.

In some embodiments, each strut of the multiple struts defines a hole located proximal to the first strut end of the strut. The first pole end of each pole of the multiple poles has a threaded extension inserted through the hole defined by the strut.

In some embodiments, multiple grommets are inlaid in the canopy. The first pole end of each pole of the multiple poles has a threaded extension inserted through a respective grommet of the multiple grommets.

In some embodiments, the apparatus and system further includes a groundsheet. A second end of each pole, distal to the first pole end, is secured to the groundsheet such that the groundsheet is laterally stretched.

In some embodiments, each pole of the multiple poles telescopes to vary a distance between the canopy and the groundsheet. Each of the canopy and the groundsheet is made of at least one of waterproofed fabric, plastic, or canvas.

In some embodiments, the second pole end of each pole of the multiple poles has a rod configured to anchor the multiple poles. The apparatus further includes multiple skirt locks configured to secure an edge of the canopy to the multiple poles.

In some embodiments, the planar panel assembly includes a first planar panel positioned parallel to the platform. The first planar panel defines a threaded hole. The threaded fastener is secured to the first planar panel through the threaded hole defined by the first planar panel. Multiple connectors are secured to a surface of the first planar panel distal to the platform.

In some embodiments, the planar panel assembly further includes a second planar panel secured to the first planar panel by the multiple connectors. The second planar panel is positioned parallel to the first planar panel. The first planar panel is positioned between the platform and the second planar panel. The second planar defines an opening.

In some embodiments, each of the platform, the first planar panel, and the second planar panel is made of at least one of metal, wood, or engineering plastic. The multiple connectors are made of at least one of metal, wood, rubber, or engineering plastic.

In some embodiments, a drainpipe section is secured to a surface of the second planar panel distal to the first planar panel. The drainpipe section defines a mouth of the drainpipe section aligned with the opening defined by the second planar panel.

In some embodiments, the drainpipe section is inserted through a perforation in the canopy. The planar panel assembly is further configured to allow rainwater falling on to the apparatus to flow through the opening defined by the second planar panel, the perforation, and the mouth of the drainpipe section.

In some embodiments, a pair of gaskets are positioned on either side of the segment of the canopy and configured to protect the segment of the canopy.

In some embodiments, a locknut is configured to be tightened about a threaded portion of the drainpipe section distal to the second planar panel. The locknut is configured to secure the pair of gaskets and the segment of the canopy to the planar panel assembly.

In some embodiments, the canopy is supported by the planar panel assembly in a pyramidal arrangement. The apparatus is configured to deflect rainwater falling onto the canopy.

In some embodiments, the planar panel assembly is further configured to place the canopy in a funnel-shaped arrangement. The apparatus is configured to allow rainwater falling onto the canopy to flow into the apparatus.

In some embodiments, a hasp is secured to the platform. The hasp is configured to secure a first end of the threaded fastener to the platform. The first threaded fastener end is proximal to the platform. The threaded fastener is supported by the platform at the first threaded fastener end.

In some embodiments, the threaded fastener has a protuberance disposed on a first end of the threaded fastener. The protuberance has at least one dimension larger than a diameter of the aperture in the platform. The protuberance is configured to rest against the platform.

In some embodiments, a pin is inserted through a second end of the threaded fastener distal to the first threaded fastener end. The pin is configured to be rotated around the longitudinal axis of the threaded fastener to rotate the threaded fastener through the aperture in the platform.

In some embodiments, one or more zippers are secured to at least one section of the canopy. The one or more zippers are operable to fasten the at least one section of the canopy to at least one other section of the canopy.

These and other aspects, features, and implementations can be expressed as methods, apparatus, systems, components, means, or steps for performing a function, and in other ways.

These and other aspects, features, and implementations will become apparent from the following descriptions, including the claims.

DETAILED DESCRIPTION

Figure 1:
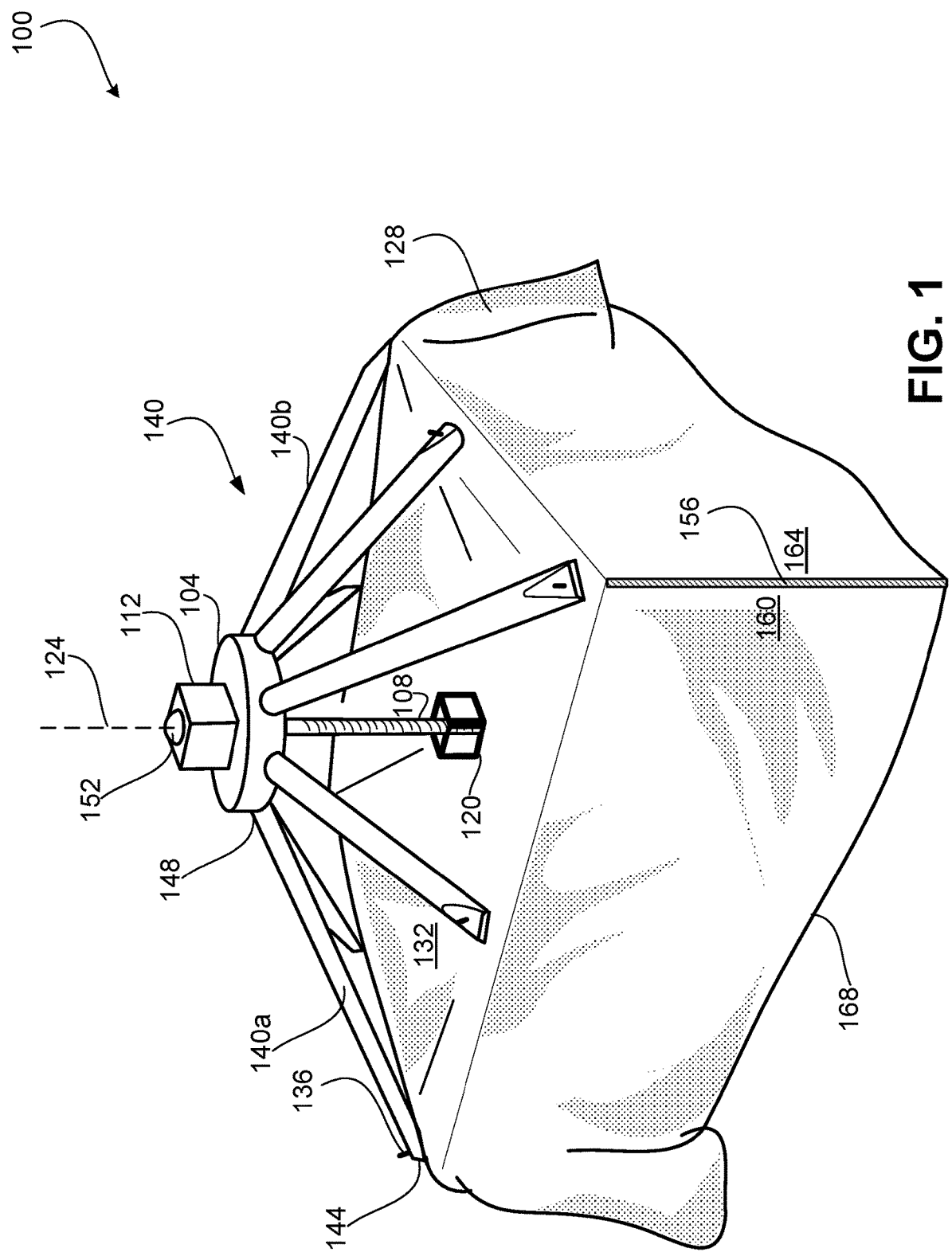
FIG. 1 shows a perspective view of a rainwater harvesting apparatus for an emergency shelter, in accordance with one or more embodiments.

In the following description, for the purposes of explanation, numerous specific details are set forth in order to provide a thorough understanding of the embodiments disclosed. Reference will now be made in detail to embodiments, examples of which are illustrated in the accompanying drawings. In the following detailed description, numerous specific details are set forth in order to provide a thorough understanding of the various described embodiments. It will be apparent, however, that the embodiments disclosed may be practiced without these specific details.

A rainwater harvesting system and apparatus for an emergency shelter is disclosed. The apparatus is sometimes referred to as a "Hydo Util Tent" (HUT). In some embodiments, the apparatus includes a platform defining an aperture located proximal to a center of the platform. The platform is made of a rigid material, such as metal, wood, or engineering plastic. The apparatus further includes a threaded fastener, for example, a threaded bolt or screw, inserted through the aperture of the platform. The threaded fastener can be rotated through the aperture. The threaded fastener is made of metal, engineering plastic, or wood. The apparatus also includes a planar panel assembly fastened to the platform by the threaded fastener. The planar panel assembly is configured to move on the threaded fastener along a longitudinal axis of the threaded fastener when the threaded fastener is rotated through the aperture in the platform. For example, when the threaded fastener is rotated in a clockwise direction, the planar panel assembly moves in a direction towards the platform.

The apparatus further includes a canopy secured to the planar panel assembly, such that a segment of the canopy moves together with the planar panel assembly along the longitudinal axis of the threaded fastener as the planar panel assembly moves on the threaded fastener. The platform, planar panel assembly thus form a system in which the planar panel assembly and the segment of the canopy move along the longitudinal axis of the threaded fastener when the threaded fastener is rotated. The apparatus and system can be placed in a rainwater-harvesting configuration when the planar panel assembly places the canopy in a funnel-shaped arrangement, such that rainwater falling onto the canopy flows into the apparatus. The apparatus and system can be placed in a rainwater-deflecting configuration when the canopy is supported by the planar panel assembly in a pyramidal arrangement, such that the apparatus deflects rainwater falling onto the canopy. In the rainwater-harvesting configuration, the system can be used to harvest rainwater for the emergency shelter. In the rainwater-deflecting configuration, the system can be used to protect the emergency shelter from rain, snow, sleet, or hail.

Among other benefits and advantages of the embodiments disclosed, the apparatus and system can be rapidly deployed to provide a portable emergency shelter or disaster relief housing. The HUT can be used as a multi-person emergency shelter that is resistant to storms, transportable on foot, and captures rainwater. The apparatus enables self-sufficiency, particularly regarding potable water, and enables HUT occupants to withstand global disasters, such as caused by COVID-19. For example, environmental contamination and scarcity of resources, principally of water, fuel, and food stuffs, can cause desperation and lawlessness. Free-standing buildings and recreational vehicles can fail to provide sanctuary. In such a scenario, the HUT, pitched after an hour's backpacking in the wild, can present protection. For example, when a disaster grabs hold, HUT users (e.g., families) can execute evacuation plans. Separated waystations can be pinpointed on topographical maps, each intended for an extended stay. During an actual crisis, whenever one station is compromised another can be substituted.

The HUT's sourcing of clean water and travel afoot permit isolation, and thereby, safety and security. For example, HUT leaders can survey prospective waystations on site, provisioning a half dozen selected with hermetically contained dried food and medical supplies. Notably, while such day trips into the rough (by vehicle and hiking), during good weather, have a grand purpose, they are adventuresome as well.

While the apparatus is weather resistant, the walls when unfastened allow the use of sunlight and fresh air to aid in ventilation. The apparatus can be used to harvest rainwater for drinking and cleaning purposes and also to protect users from the rain. The apparatus is easy to ship and assemble, allowing for minimal storage space. The apparatus is portable and does not need a costly concrete foundation. The apparatus can be assembled using simple tools in a short time period. Furthermore, multiple units of the apparatus can be integrated as a modular array for specific needs. The apparatus can also be customized with respect to its width, length and height for different applications. In addition, modular walls, doors, or interior dividers can be added when needed.

Figure 2:
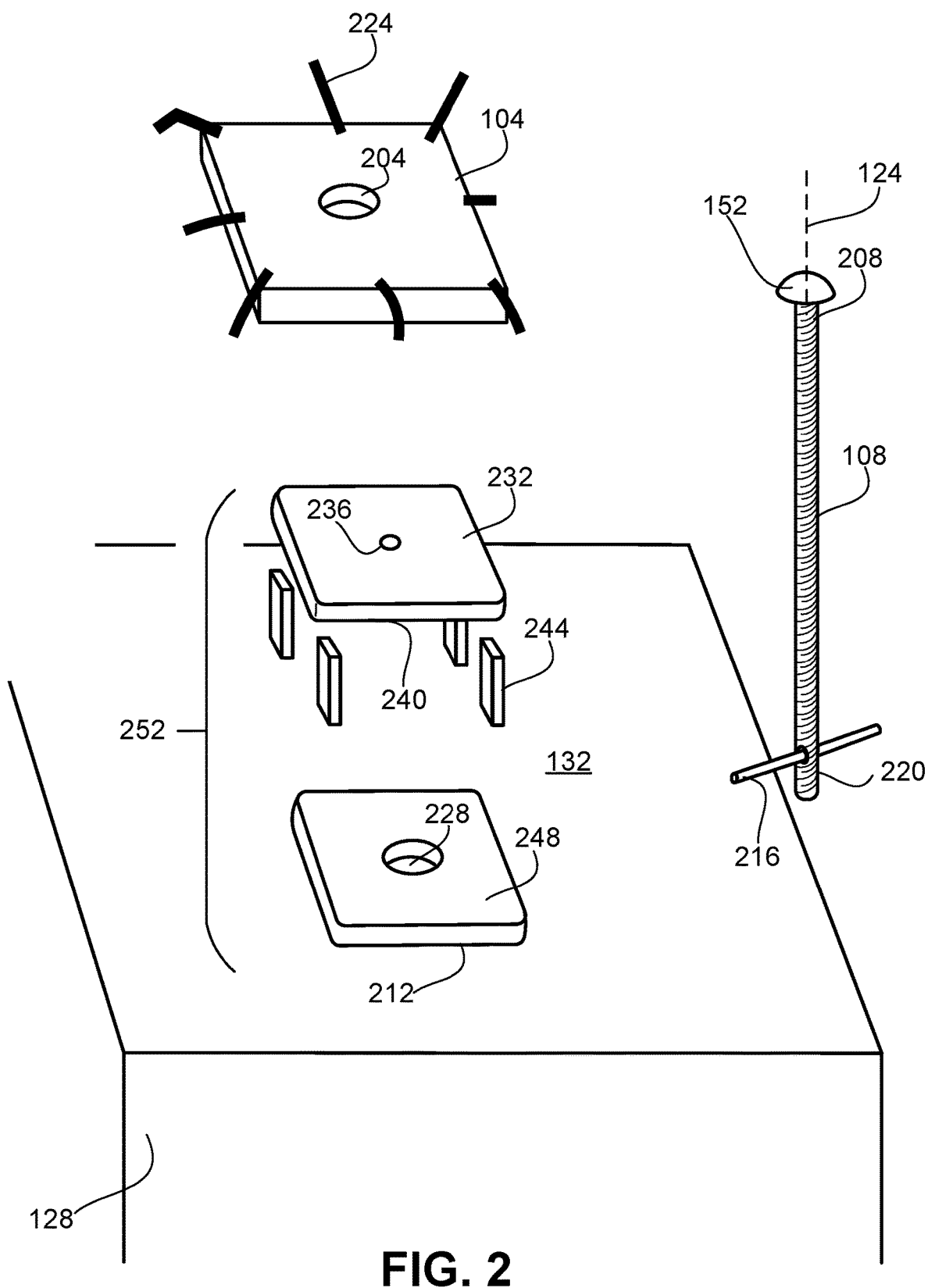
FIG. 2 shows a perspective view of components of the apparatus, in accordance with one or more embodiments.

FIG. 1 shows a perspective view of a rainwater harvesting apparatus 100 for an emergency shelter, in accordance with one or more embodiments. The apparatus 100 includes a platform 104, a threaded fastener 108, a planar panel assembly 116, and a canopy 128. The platform 104 is sometimes referred to as an "apex platform." The platform 104 is made of a rigid material, such as wood, metal (for example, steel or aluminum), engineering plastic, or reinforced rubber. Engineering plastic refers to a thermoplastic material, such as acrylonitrile butadiene styrene (ABS), and has better mechanical and/or thermal properties than commodity plastics. Reinforced rubber includes rubber and a reinforcing material to provide a higher strength to flexibility ratio and improved stiffness compared to traditional rubber. The platform 104 can be round (as shown in FIG. 1), oval, square (as shown in FIG. 2), rectangular, or another polygonal shape.

In some embodiments, the platform 104 defines an unthreaded aperture located proximal to a center of the platform 104. An example aperture 204 is illustrated with reference to FIG. 2. The threaded fastener 108 is inserted through the unthreaded aperture 204, such that it can be rotated through the unthreaded aperture 204. The threaded fastener 108 is a screw or a bolt having external male threads. The threaded fastener 108 is made of metal (for example, aluminum), engineering plastic, or wood. The aperture 204 in the platform 104 is not threaded. The threaded fastener 108 can thus rotate freely through the aperture 204 in the platform 104. In some embodiments as illustrated in FIG. 1, a block 112 is secured to the platform 104. The block 112 defines a hole, such that the threaded fastener 108 can be inserted through the aperture 204 and the hole defined by the block 112. The block 112 provides additional support to the threaded fastener 108.

The planar panel assembly 116 is fastened to the platform 104 by the threaded fastener 108. (The planar panel assembly is illustrated and described in more detail with reference to FIG. 2.) The planar panel assembly 116 and the platform 104 are thus releasably secured to each other, such that the planar panel assembly 116 and the platform 104 are intact and usable post-release. The planar panel assembly 116 is secured to the threaded fastener 108 and is configured to move on the threaded fastener 108 along a longitudinal axis 124 of the threaded fastener 108 as the threaded fastener 108 is rotated through the aperture 204 in the platform 104. In some embodiments as illustrated in FIG. 1, a block 120 is secured to the planar panel assembly 116, such that the threaded fastener 108 passes through the block 120. The block 120 provides additional support to the threaded fastener 108.

In some embodiments, when the threaded fastener 108 is rotated in a clockwise direction, the planar panel assembly 116 moves in a direction towards the platform 104. For example, the planar panel assembly 116 moves towards the platform 104 along the longitudinal axis 124 of the threaded fastener 108 when the threaded fastener 108 rotates in a clockwise direction. The planar panel assembly 116 moves away from the platform 104 along the longitudinal axis 124 of the threaded fastener 108 when the threaded fastener 108 rotates in an anti-clockwise direction. In other embodiments, the planar panel assembly 116 moves towards the platform 104 along the longitudinal axis 124 of the threaded fastener 108 when the threaded fastener 108 rotates in an anti-clockwise direction. In such embodiments, the planar panel assembly 116 moves away from the platform 104 along the longitudinal axis 124 of the threaded fastener 108 when the threaded fastener 108 rotates in a clockwise direction.

The canopy 128 is secured to the planar panel assembly 116, such that a segment 132 of the canopy 128 moves together with the planar panel assembly 116 along the longitudinal axis 124 of the threaded fastener 108 as the planar panel assembly 116 moves on the threaded fastener 108. The segment 132 is sometimes referred to as a "roof segment." The planar panel assembly 116 and the canopy 128 are releasably secured to each other, such that the planar panel assembly 116 and the canopy 128 104 are intact and usable post-release. The planar panel assembly 116 and the segment 132 of the canopy 128 thus move in tandem as the threaded fastener 108 is rotated. The canopy 128 is made of waterproofed fabric, plastic, canvas, another waterproof material, or a combination thereof.

As described, in some embodiments, the planar panel assembly 116 and the segment 132 of the canopy 128 move in a direction towards the platform 104 along the longitudinal axis 124 of the threaded fastener 108 when the threaded fastener 108 is rotated in a clockwise direction. The planar panel assembly 116 and the segment 132 of the canopy 128 move in a direction away from the platform 104 when the threaded fastener 108 is rotated in an anti-clockwise direction. In other embodiments, the planar panel assembly 116 and the segment 132 of the canopy 128 move in a direction towards the platform 104 along the longitudinal axis 124 of the threaded fastener 108 when the threaded fastener 108 is rotated in an anti-clockwise direction. In such embodiments, the planar panel assembly 116 and the segment 132 of the canopy 128 move in a direction away from the platform 104 when the threaded fastener 108 is rotated in a clockwise direction.

The apparatus 100 further includes multiple struts 140 supported in a pyramidal arrangement. The struts 140 can be made of metal (for example, aluminum or steel) or engineering plastic. The multiple struts 140 are supported by multiple poles. An example of the multiple poles (poles 604) is illustrated and described in more detail with reference to FIG. 6. Each strut 140a has a first end 144 and a second end 148 distal to the first end 144. The first strut end 144 is distal to the platform 104. The second strut end 148 is proximal to and secured to the platform 104. The second strut end 148 and the platform 104 are releasably secured to each other, such that the strut 140a and the platform 104 are intact and usable post-release. Each strut 140a defines a hole located proximal to the first strut end 144 of the strut 140a. The first strut end 144 of the strut 140a is secured to a first pole end 612 of a respective pole (for example, pole 604b shown in FIG. 6) of the multiple poles 604. The first strut end 144 and the pole 604b are releasably secured to each other, such that the strut 140a and the pole 604b are intact and usable post-release. An example first pole end 612 of an example pole 604b is illustrated and described in more detail with reference to FIG. 6. The first pole end 612 of each pole 604b has a threaded extension 136 inserted through the hole defined by a respective strut 140a of the multiple struts 140 to support the struts 140, the canopy 128, and the platform 104.

By moving on the threaded fastener 108 in a direction away from the platform 104, the planar panel assembly 116 is configured to place the canopy 128 in a funnel-shaped arrangement, as shown in FIG. 1. By placing the canopy 128 in a funnel-shaped arrangement, the apparatus is placed in a rainwater-harvesting configuration, such that the apparatus 100 is configured to allow rainwater falling onto the canopy 128 to flow into the apparatus 100. The rainwater-harvesting configuration is sometimes referred to as a "rainwater-capture mode." The rainwater can be collected in a receptacle (for example, a bucket or bowl) positioned beneath the canopy 128 and the planar panel assembly 116. The rainwater can be used for drinking, washing, or cleaning in the emergency shelter.

The threaded fastener 108 has a protuberance 152 disposed on a first end of the threaded fastener 108. In some embodiments, the protuberance is a rounded carriage bolt head. An example first end 208 of the threaded fastener 108 is illustrated with reference to FIG. 2. The protuberance 152 has at least one dimension larger than a diameter of the aperture 204 in the platform 104. The protuberance 152 is configured to rest against the platform 104, such that the platform 104 supports the threaded fastener 108. In some embodiments, one or more zippers 156 are secured to at least one section 160 of the canopy 128. The one or more zippers 156 are operable to fasten the at least one section 160 of the canopy 128 to at least one other section 164 of the canopy 128. In such a manner, an opening or space between the sections 160, 164 can be sealed and the material of the canopy 128 appears neater and not bunched up between the sections 160, 164.

In some embodiments, the canopy 128 is integral with the only elements being grommet holes, the aperture 308 (see FIG. 3), zippers 156, and optional portholes. Loose fabric, gathered at the apparatus 100's corners when the canopy 128 is stretched down to ground level is secured using hook-and-loop fasteners or other means. The one or more zippers 156 are operable to fasten together quartered sections of the canopy 128.

FIG. 2 shows a perspective view of components of the apparatus 100, in accordance with one or more embodiments. The apparatus 100, when assembled using at least some of the components shown in FIG. 2, is illustrated and described in more detail with reference to FIG. 1. The components of the apparatus 100 include the platform 104 defining the unthreaded aperture 204. The unthreaded aperture can be round, oval, square, rectangular, or another polygonal shape. The platform 104 is illustrated and described in more detail with reference to FIG. 1.

The apparatus 100 includes multiple straps 224. Each strap 224 is used to secure the second strut end 148 of a respective strut 140a of the plurality of struts 140 to the platform 104. The second strut end 148, strut 140a, and struts 140 are illustrated and described in more detail with reference to FIG. 1. The multiple straps 224 are made from at least one of metal, nylon, fabric, plastic, or hemp. In some embodiments, the multiple straps 224 are made of solid plastic or metal shaped to connect the struts 224 (of varying lengths and slopes) to corresponding pole ends, so that the platform is level.

The threaded fastener 108 can be inserted through the aperture 204 and rotated through the aperture 204. The threaded fastener 108 is illustrated and described in more detail with reference to FIG. 1. The threaded fastener 108 has a protuberance 152 disposed on a first end 208 of the threaded fastener 108. The protuberance 152 is illustrated and described in more detail with reference to FIG. 1. The protuberance 152 has at least one dimension larger than a diameter of the aperture 204 in the platform 104. The protuberance 152 is configured to rest against the platform 104, such that the platform 104 supports the threaded fastener 108. The apparatus 100 includes a pin 216 inserted through a second end 220 of the threaded fastener 108. The second threaded fastener end 220 is distal to the first threaded fastener end 208. The pin 216 configured to be rotated around the longitudinal axis 124 of the threaded fastener 108 to rotate the threaded fastener 108 through the aperture 204 in the platform 104. The longitudinal axis 124 of the threaded fastener 108 is illustrated and described in more detail with reference to FIG. 1. When the apparatus 100 is assembled, the pin is located to one side of the planar panel assembly 116 distal to the platform 104 and within the enclosure of the apparatus 100.

The planar panel assembly 116 includes a first planar panel 232 positioned parallel to the platform 104. The planar panel assembly 116 is illustrated and described in more detail with reference to FIG. 1. The first planar panel 232 is made of at least one of metal, wood, reinforced rubber, or engineering plastic. The first planar panel 232 defines a threaded hole 236 located proximal to a center of the first planar panel 232. The threads of the threaded hole 236 defined by the first planar panel 232 match the threads of the threaded fastener 108, such that the threaded fastener 108 can be secured to the first planar panel 232 through the threaded hole 236 defined by the first planar panel 232.

The planar panel assembly 116 includes multiple connectors 244 secured to a surface 240 of the first planar panel 232 distal to the platform 104. The multiple connectors 244 are made of at least one of metal (for example, aluminum), wood, rubber, or engineering plastic. The planar panel assembly 116 further includes a second planar panel 248 secured to the first planar panel 232 by the multiple connectors 244. The multiple connectors 244 thus provide a spacing between the first planar panel 232 and the second planar panel 248 and also secure the first planar panel 232 to the second planar panel 248. The second planar panel 248 is made of at least one of metal, wood, rubber, or engineering plastic. The second planar panel 248 is positioned parallel to the first planar panel 232. The first planar panel 232 is positioned between the platform 104 and the second planar panel 248. The second planar panel 248 defines an opening 228 located proximal to a center of the second planar panel 248. When used in the rainwater-harvesting configuration, rainwater is allowed to flow through the spacing between the first planar panel 232 and the second planar panel 248 and into the opening 228 defined by the second planar panel 248. The opening drains rainwater into a living space below the canopy 128 and can be funneled into containers (closable bladders).

The planar panel assembly 116 is fastened to the platform 104 by the threaded fastener 108. The planar panel assembly 116 is configured to move on the threaded fastener 108 along the longitudinal axis 124 of the threaded fastener 108 as the threaded fastener 108 is rotated through the aperture 204 in the platform 104. The first planar panel 232 is therefore supported by the threaded fastener 108 and rides the threads of the threaded fastener 108 along the longitudinal axis 124 of the threaded fastener 108 as the threaded fastener 108 is rotated through the aperture 204 in the platform 104. The canopy 128 is secured to an underside 212 of the planar panel assembly 116. The canopy 128 is secured to the planar panel assembly 116, such that a segment 132 of the canopy 128 moves together with the planar panel assembly 116 along the longitudinal axis 124 of the threaded fastener 108 as the planar panel assembly 116 moves on the threaded fastener 108.

In some embodiments, a drainpipe section is inserted through a perforation in the canopy 128. An example perforation 308 in the canopy 128 is illustrated and described in more detail with reference to FIG. 3. The perforation 308 is located within the segment 132 of the canopy 128. An example drainpipe section 1008 is illustrated and described in more detail with reference to FIG. 10. The planar panel assembly 116 is further configured to allow rainwater falling on to the apparatus 100 to flow through the opening 228 defined by the second planar panel, the perforation 308, and a mouth of the drainpipe section 1008. An example mouth 1012 of the drainpipe section 1008 is illustrated and described in more detail with reference to FIG. 10.

Figure 3:
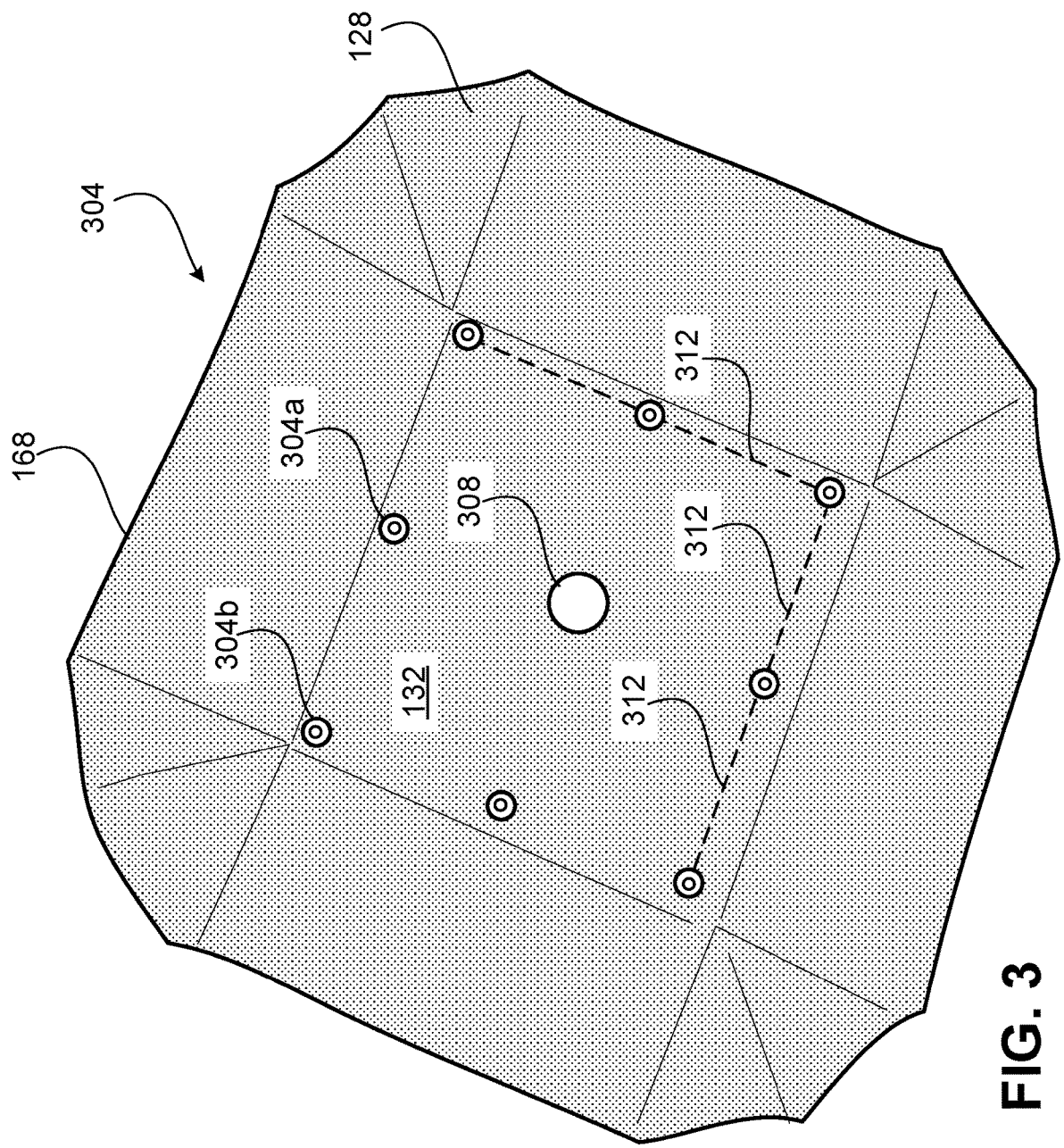
FIG. 3 shows a planar view of a canopy, in accordance with one or more embodiments.

FIG. 3 shows a planar view of a canopy 128, in accordance with one or more embodiments. The canopy 128 is illustrated and described in more detail with reference to FIG. 1. As described with reference to FIG. 1, the canopy 128 is secured to the planar panel assembly 116, such that a segment 132 of the canopy 128 moves together with the planar panel assembly 116 along the longitudinal axis 124 of the threaded fastener 108 as the planar panel assembly 116 moves on the threaded fastener 108. The planar panel assembly 116, segment 132, longitudinal axis 124, and threaded fastener 108 are illustrated and described in more detail with reference to FIG. 1.

As illustrated in FIG. 3, multiple grommets 304 are inlaid in the canopy 128. A grommet is a ring or edge strip inserted into a perforation through the canopy 128. In some embodiments, the grommets 304 are flared or collared on each side to keep them in place. The grommets 304 can be made of metal, plastic, or rubber. The grommets 304 are arranged around a central perforation 308 in the canopy 128. In some embodiments, a diameter of the perforation 308 is in a range from 2-4 inches. The perforation 308 is located within the segment 132 of the canopy 128. For example, the grommets 304 can be arranged in a polygonal formation (a square, a rectangle, or a hexagon), a circle, or an oval to surround the perforation 308 in the center of the canopy 128. Each grommet 304a of the multiple grommets 304 is spaced apart from each other grommet 304b of the multiple grommets 304. The multiple grommets 304 are thus inlaid in the canopy 128 on a periphery 312 of the polygonal formation.

A first end of each pole of multiple poles of the apparatus 100 has a threaded extension 136 inserted through a respective grommet 304a of the multiple grommets 304 to support the struts 140, the canopy 128, and the platform 104. The apparatus 100, when assembled using at least some of the components shown in FIG. 2, is illustrated and described in more detail with reference to FIG. 1. An example first pole end 612, example pole 604b, and example poles 604 are illustrated and described in more detail with reference to FIG. 6. The threaded extension 136 is illustrated and described in more detail with reference to FIG. 1. In some embodiments, the apparatus 100 further includes multiple skirt locks configured to secure an edge 168 of the canopy 128 to the multiple poles 604. An example skirt lock 1308 is illustrated and described in more detail with reference to FIG. 13B.

A drainpipe section is inserted through the perforation 308 in the canopy 128. In a rainwater-harvesting configuration, the planar panel assembly 116 is configured to allow rainwater falling on to the apparatus 100 to flow through the opening 228 defined by the second planar panel 248, the perforation 308, and a mouth of the drainpipe section. An example drainpipe section 1008 is illustrated and described in more detail with reference to FIG. 10. The opening 228 and second planar panel 248 are illustrated and described in more detail with reference to FIG. 2. An example mouth 1012 of the drainpipe section 1008 is illustrated and described in more detail with reference to FIG. 10.

Figure 4:
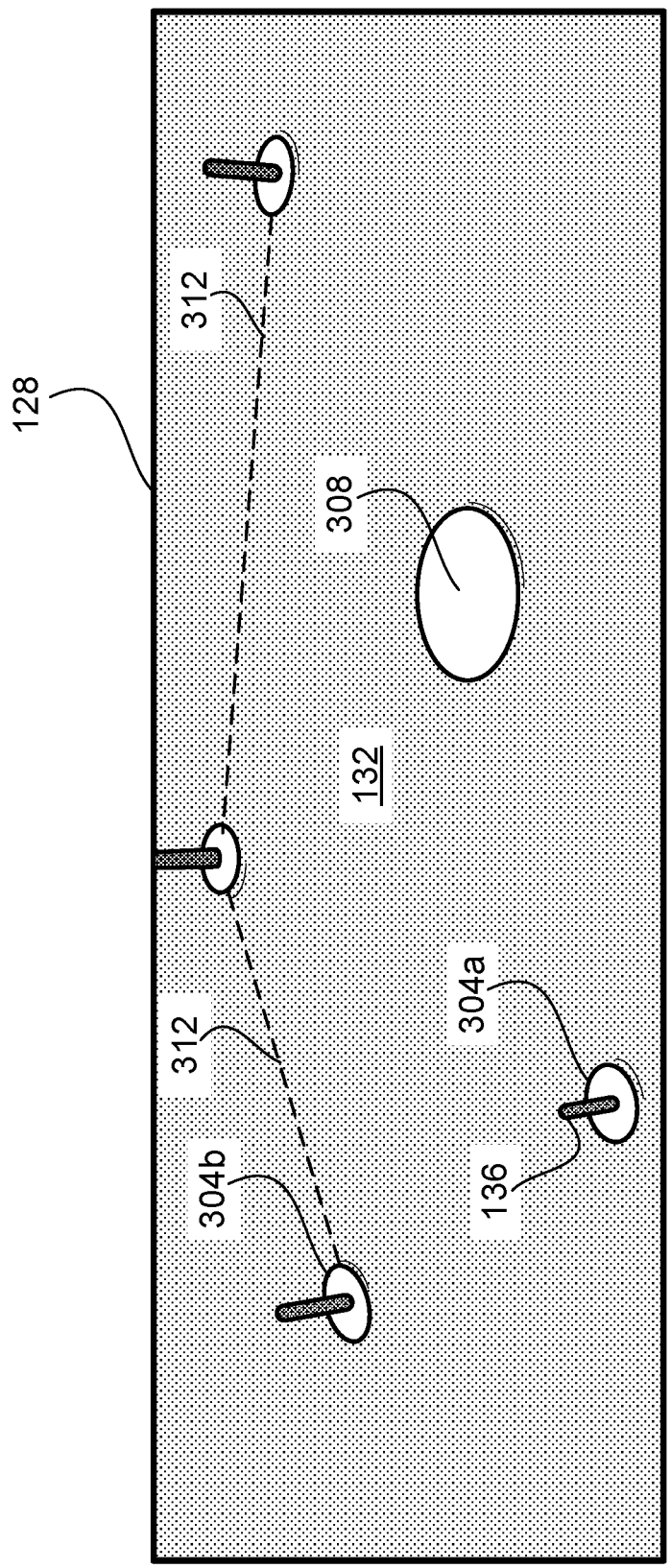
FIG. 4 shows a perspective view of a segment of the canopy, in accordance with one or more embodiments.

FIG. 4 shows a perspective view of a segment 132 of the canopy 128, in accordance with one or more embodiments. The segment 132 of the canopy 128 are illustrated and described in more detail with reference to FIG. 1. The canopy 128 is secured to a planar panel assembly 116, such that the segment 132 of the canopy 128 moves together with the planar panel assembly 116 along the longitudinal axis 124 of the threaded fastener 108 as the planar panel assembly 116 moves on the threaded fastener 108. The planar panel assembly 116, longitudinal axis 124, and the threaded fastener 108 are illustrated and described in more detail with reference to FIG. 1.

As illustrated and described with reference to FIG. 3, multiple grommets 304 are inlaid in the canopy 128. A first end of each pole of multiple poles of the apparatus 100 has a threaded extension 136 inserted through a respective grommet 304a of the multiple grommets 304 to support the struts 140, the canopy 128, and the platform 104. The apparatus 100, when assembled using at least some of the components shown in FIG. 4, is illustrated and described in more detail with reference to FIG. 1. An example first pole end 612, example pole, and example poles 604 are illustrated and described in more detail with reference to FIG. 6. The planar panel assembly 116 is configured to allow rainwater falling on to the apparatus 100 to flow through the perforation 308 in the canopy 128 illustrated in FIG. 4. The perforation 308 is located within the segment 132 of the canopy 128. The perforation 308 in the canopy 128 is illustrated and described in more detail with reference to FIG. 3. In some embodiments, a diameter of the perforation 308 is in a range from 2-4 inches.

Figure 5:
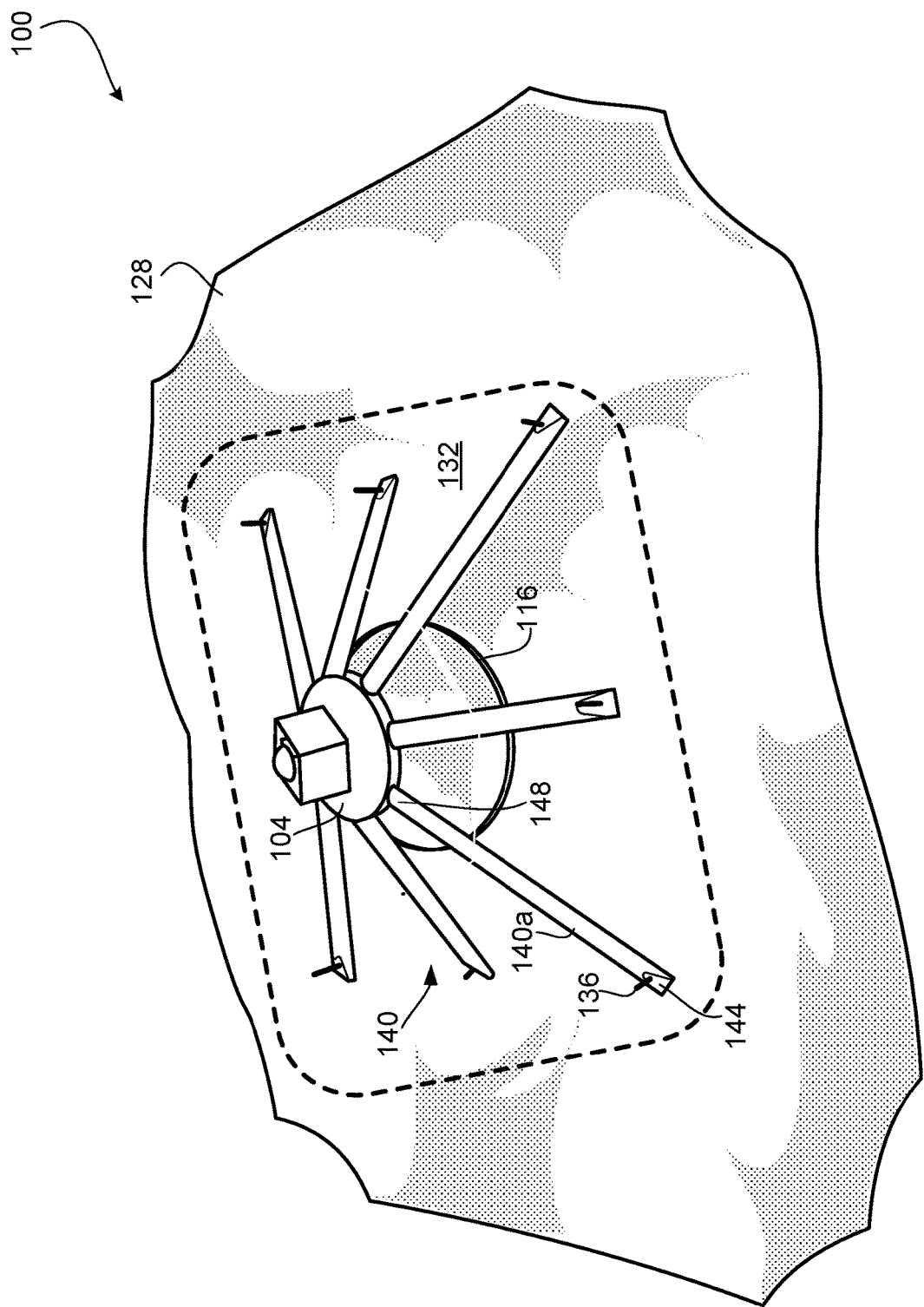
FIG. 5 shows a perspective view of the apparatus, in accordance with one or more embodiments.

FIG. 5 shows a perspective view of the apparatus 100, in accordance with one or more embodiments. The apparatus 100, when assembled using at least some of the components shown in FIG. 5, is illustrated and described in more detail with reference to FIG. 1. In FIG. 5, the apparatus is shown placed in a rainwater-deflecting configuration. The rainwater-deflecting configuration is sometimes referred to as a "water-shed mode" or "pyramidal mode."

In some embodiments, as illustrated in FIG. 2, the apparatus 100 includes the platform 104 defining an unthreaded aperture 204. The platform 104, threaded fastener 108, and unthreaded aperture 204 are illustrated and described in more detail with reference to FIG. 2. The planar panel assembly 116, illustrated in FIG. 5, is fastened to the platform 104 by the threaded fastener 108. The planar panel assembly 116 is illustrated and described in more detail with reference to FIG. 2. The planar panel assembly 116 moves on the threads of the threaded fastener 108 as the threaded fastener 108 is rotated. The canopy 128 is secured to the planar panel assembly 116, such that a segment 132 of the canopy 128 moves together with the planar panel assembly 116 as the planar panel assembly 116 moves on the threaded fastener 108. The segment 132 of the canopy 128 is illustrated and described in more detail with reference to FIG. 3.

The apparatus 100 includes multiple struts 140 supported in a pyramidal arrangement by multiple poles. Example poles 604 are illustrated and described in more detail with reference to FIG. 6. A first end 144 of each strut 140a of the multiple struts 140 is secured to a first pole end of a respective pole of the multiple poles 604. An example first pole end 612 of an example pole 604*b* is illustrated and described in more detail with reference to FIG. 6. Each strut 140*a* defines a hole located proximal to the first strut end 144. The first pole end 612 of each pole 604*b* of the multiple poles 604 has a threaded extension 136 inserted through the hole defined by a respective strut 140*a* of the multiple struts 140, as shown in FIG. 5, to support the struts 140, the canopy 128, and the platform 104. A second strut end 148 of the strut 140*a* is secured to the platform 104.

In the rainwater-deflecting configuration illustrated in FIG. 5, the planar panel assembly 116 moves in a direction towards the platform 104. The canopy 128 is supported by the planar panel assembly 116 in a pyramidal arrangement. The apparatus 100 is thus configured to deflect rainwater falling onto the canopy 128.

Figure 6:
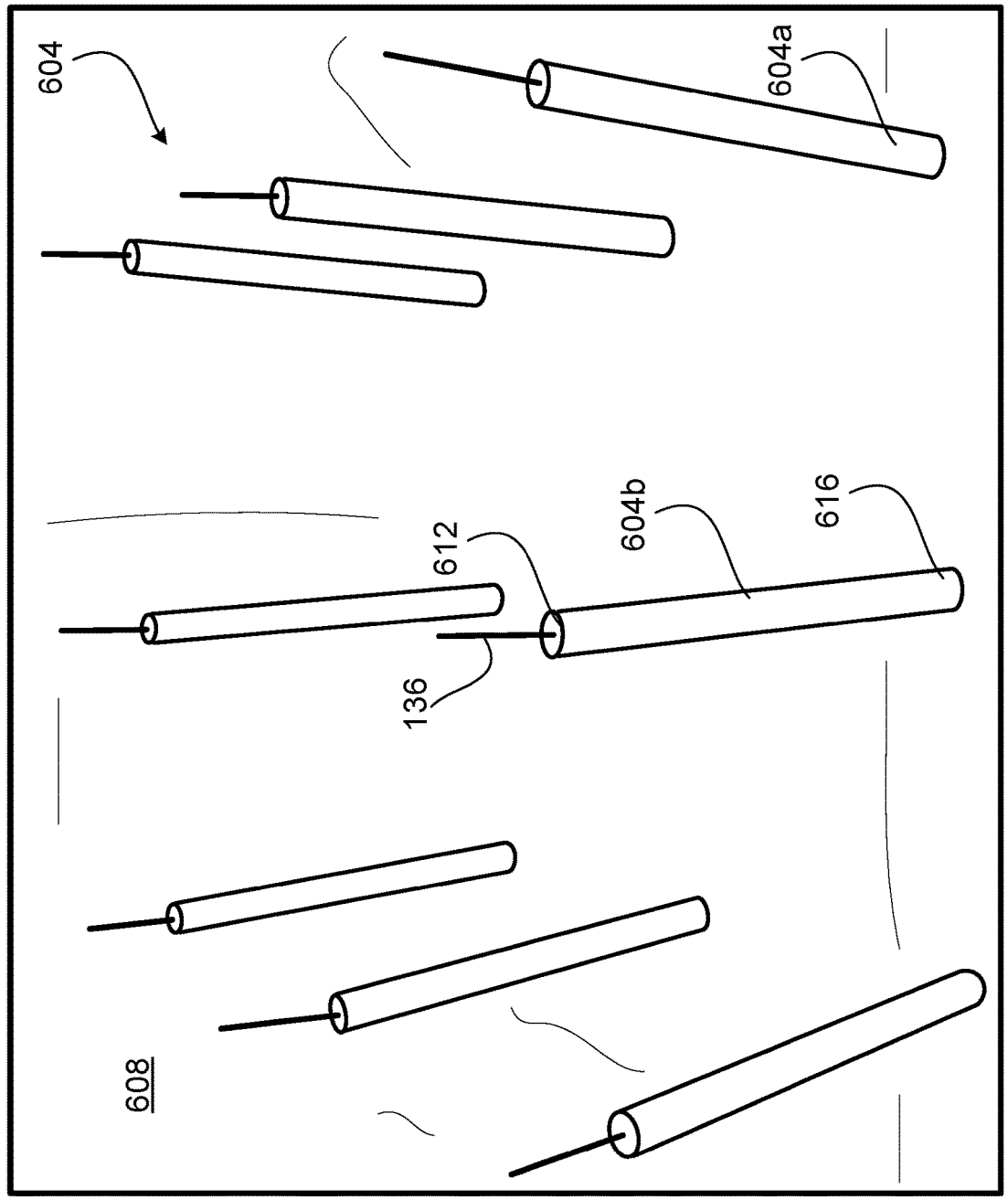
FIG. 6 shows a perspective view of multiple poles, in accordance with one or more embodiments.

FIG. 6 shows a perspective view of multiple poles 604, in accordance with one or more embodiments. The multiple poles 604 are used to support the canopy 128, as illustrated and described in more detail with reference to FIG. 7. A first end 612 of each pole 604*b* of the multiple poles 604 is secured to the canopy 128. Each pole 604*a* can be a tent pole (for example, a shock-corded fiberglass tent pole or shock-corded carbon fiber tent pole), an elongated tube, or a solid rod. The poles 604 can be made of metal (for example, aluminum or steel) or engineering plastic. The first pole end 612 of each pole 604*b* of the multiple poles 604 has a threaded extension 136 inserted through a hole defined by a respective strut of the apparatus 100. The hole defined by the respective strut is located proximal to a first end of the respective strut. An example first strut end 144 and an example strut 104*a* are illustrated and described in more detail with reference to FIG. 1. The threaded extension 136 is also inserted through a respective grommet of multiple grommets of the apparatus 100 when the apparatus 100 is assembled, as shown in FIG. 1, to support the struts 140, the canopy 128, and the platform 104. Example grommets 304 are illustrated and described in more detail with reference to FIG. 3.

In some embodiments, the apparatus includes a groundsheet 608. A groundsheet refers to a sheet of plastic, canvas, or other waterproof material that can be spread on the ground under a sleeping bag (for example, in a tent) for protection from moisture. The groundsheet 608 is sometimes referred to as a "ground cloth." A second end 616 of each pole 604*b*, distal to the first pole end 612, is secured to the groundsheet 608 such that the groundsheet 608 is laterally stretched.

Figure 7:
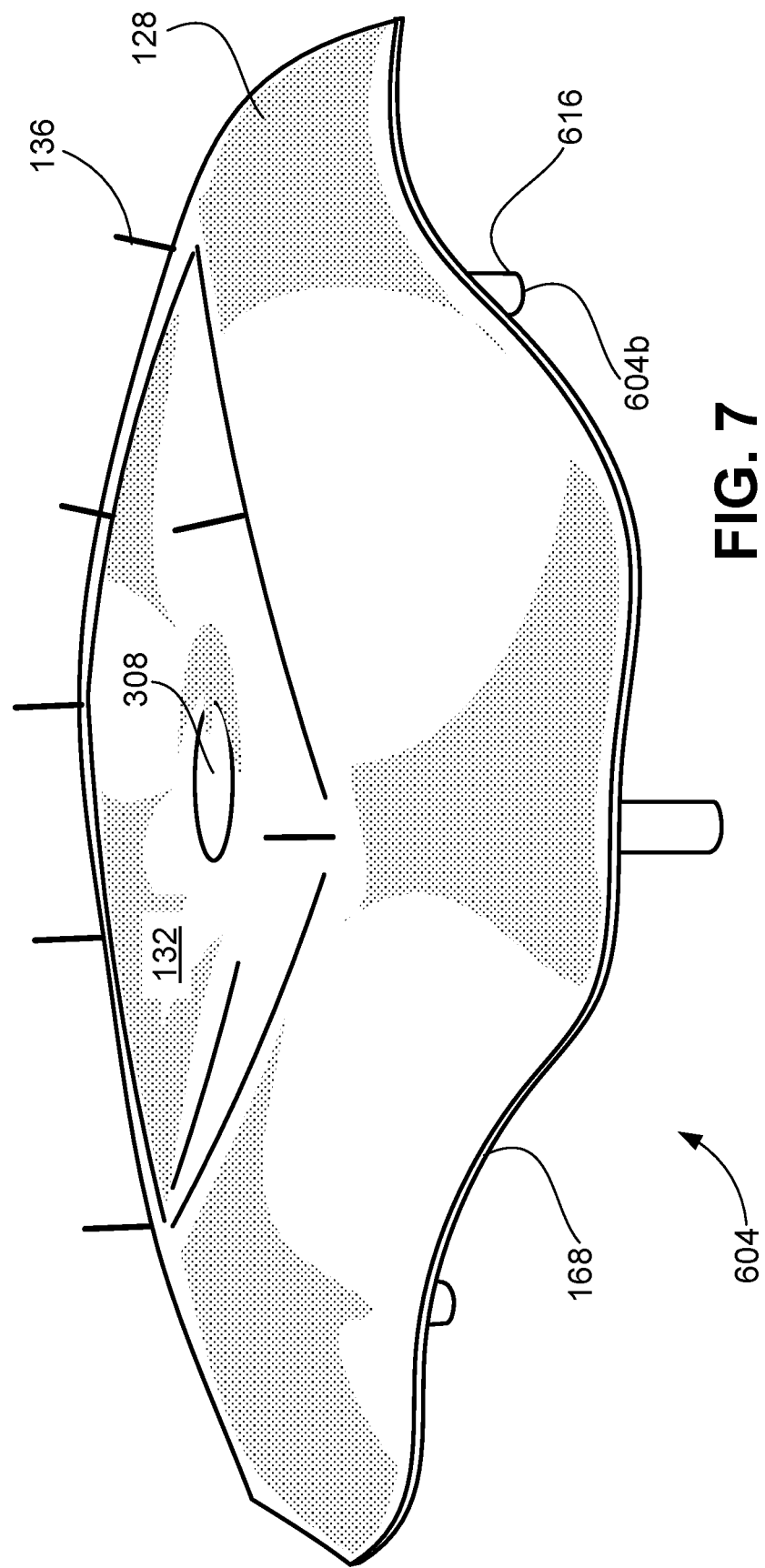
FIG. 7 shows a perspective view of the canopy, in accordance with one or more embodiments.

FIG. 7 shows a perspective view of the canopy 128, in accordance with one or more embodiments. The canopy 128 is illustrated and described in more detail with reference to FIG. 3. The canopy 128 is secured to a planar panel assembly, such that a segment 132 of the canopy 128 moves together with the planar panel assembly as the planar panel assembly moves on a threaded fastener. An example, planar panel assembly 116 and example threaded fastener 108 are illustrated and described in more detail with reference to FIG. 2. Multiple poles 604 are used to support the canopy 128. The poles 604 are illustrated and described in more detail with reference to FIG. 6. A first end 612 of each pole 604*b* of the multiple poles 604 is secured to the canopy 128. An example first pole end 612 is illustrated and described in more detail with reference to FIG. 6. The first pole end 612 of each pole 604*b* of the multiple poles 604 has a threaded extension 136. The threaded extension 136 is inserted through a respective grommet (not shown in FIG. 7) inlaid in the canopy 128 to support the struts 140, the canopy 128, and the platform 104. Example grommets 304 are illustrated and described in more detail with reference to FIG. 3.

The canopy 128 defines a perforation 308. The perforation 308 is located within the segment 132 of the canopy 128. A drainpipe section can be inserted through the perforation 308 defined by the canopy 128. An example drainpipe section 1008 is illustrated and described in more detail with reference to FIG. 10. In the rainwater-harvesting configuration, the apparatus 100 allows rainwater falling on to the apparatus 100 to flow through the perforation 308 and a mouth of the drainpipe section 1008. An example mouth 1012 of the drainpipe section 1008 is illustrated and described in more detail with reference to FIG. 10.

Figure 8:
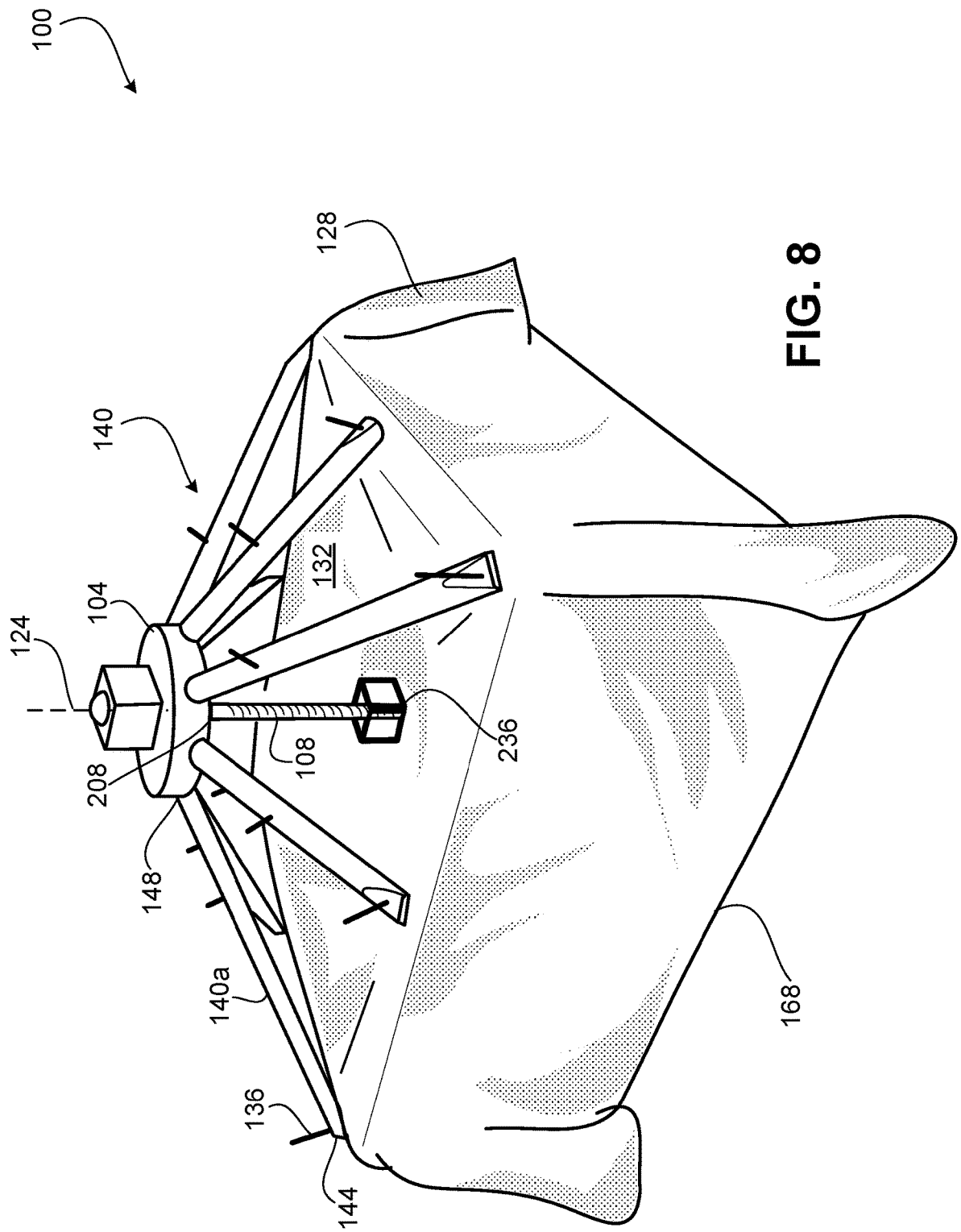
FIG. 8 shows a perspective view of the apparatus in a rainwater-harvesting configuration, in accordance with one or more embodiments.

FIG. 8 shows a perspective view of the apparatus 100 in a rainwater-harvesting configuration, in accordance with one or more embodiments. The apparatus 100 includes a platform 104 that defines an unthreaded aperture 204 (not shown in FIG. 8). The unthreaded aperture 204 is illustrated and described in more detail with reference to FIG. 2. The threaded fastener 108 is inserted through the unthreaded aperture 204 and can be rotated through the unthreaded aperture 204. A planar panel assembly 116 is fastened to the platform 104 by the threaded fastener 108. The planar panel assembly 116 is illustrated and described in more detail with reference to FIG. 2. The planar panel assembly 116 includes a first planar panel 232 (illustrated in FIG. 2) that is positioned parallel to the platform 104. The first planar panel 232 defines a threaded hole 236 located proximal to a center of the first planar panel 232. The threaded fastener 108 is secured to the first planar panel 232 through the threaded hole 236 defined by the first planar panel 232.

The apparatus 100 includes multiple struts 140 supported in a pyramidal arrangement by multiple poles. Example poles 604 are illustrated and described in more detail with reference to FIG. 6. A first end 144 of each strut 140*a* of the multiple struts 140 is secured to a first end of a respective pole of the multiple poles 604. An example first pole end 612 of a respective pole 604*b* of the multiple poles 604 is illustrated and described in more detail with reference to FIG. 6. Each strut 140*a* defines a hole located proximal to the first strut end 144 of the strut 140*a*. The first pole end 612 of each pole 604*b* of the multiple poles 604 has a threaded extension 136 inserted through the hole defined by a respective strut 140*a* of the multiple struts 140 to support the struts 140, the canopy 128, and the platform 104. A second strut end 148 is secured to the platform 104.

The planar panel assembly 116 moves on the threaded fastener 108 along a longitudinal axis 124 of the threaded fastener 108 as the threaded fastener 108 is rotated through the aperture 204 in the platform 104. The canopy 128 is secured to the planar panel assembly 116, such that a segment 132 of the canopy 128 moves together with the planar panel assembly 116 along the longitudinal axis 124 of the threaded fastener 108 as the planar panel assembly 116 moves on the threaded fastener 108. In the rainwater-harvesting configuration, the segment 132 of the canopy 128 and the planar panel assembly 116 move in a direction away from the platform 104. The planar panel assembly 116 is thereby configured to place the canopy 128 in a funnel-shaped arrangement, as shown in FIG. 8. The apparatus 100 is thereby configured to allow rainwater falling onto the canopy 128 to flow into the apparatus 100.

Figure 9:
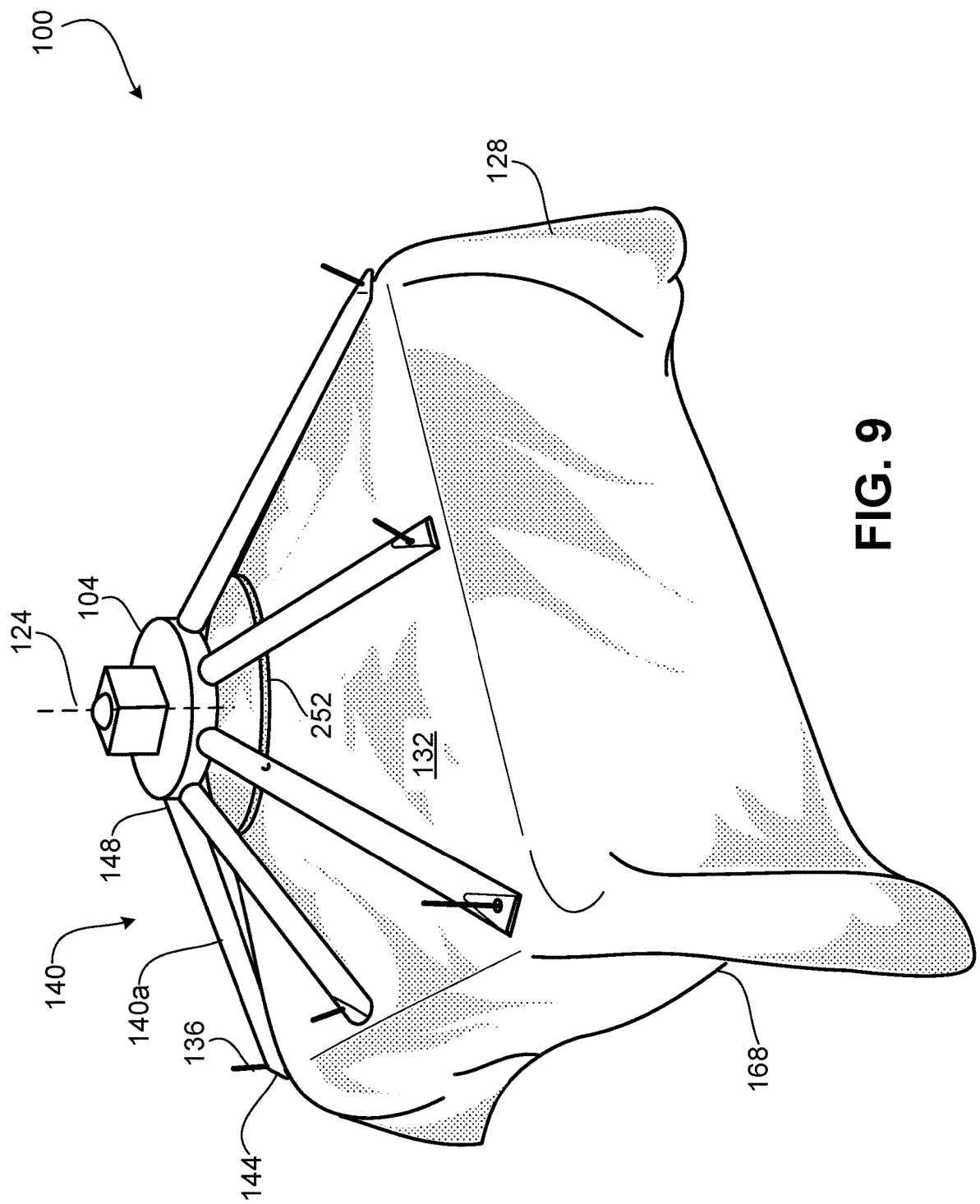
FIG. 9 shows a perspective view of the apparatus in a rainwater-deflecting configuration, in accordance with one or more embodiments.

FIG. 9 shows a perspective view of the apparatus 100 in a rainwater-deflecting configuration, in accordance with one or more embodiments. The apparatus 100 includes the platform 104 that defines an unthreaded aperture 204 (not shown in FIG. 9). The unthreaded aperture 204 is illustrated and described in more detail with reference to FIG. 2. The planar panel assembly 116 is fastened to the platform 104 by the threaded fastener 108 (not shown in FIG. 9). The planar panel assembly 116 is configured to move on the threaded fastener 108 along a longitudinal axis 124 of the threaded fastener 108 as the threaded fastener 108 is rotated through the unthreaded aperture 204 in the platform 104. The canopy 128 is secured to the planar panel assembly 116, such that a segment 132 of the canopy 128 moves together with the planar panel assembly 116 along the longitudinal axis 124 of the threaded fastener 108 as the planar panel assembly 116 moves on the threaded fastener 108.

The apparatus 100 includes multiple struts 140 supported in a pyramidal arrangement by multiple poles. Example poles 604 are illustrated and described in more detail with reference to FIG. 6. A first end 144 of each strut 140a of the multiple struts 140 is secured to a first end of a respective pole. An example first pole end 612 of an example pole 604b is illustrated and described in more detail with reference to FIG. 6. Each strut 140a defines a hole located proximal to the first strut end 144. The first pole end 612 has a threaded extension 136 inserted through the hole defined by the strut 140a to support the struts 140, the canopy 128, and the platform 104. A second strut end 148 of each strut 140a is secured to the platform 104.

In the rainwater-deflecting configuration, the segment 132 of the canopy 128 and the planar panel assembly 116 move in a direction towards the platform 104. The planar panel assembly 116 is thereby configured to place the canopy 128 in a pyramidal arrangement, as shown in FIG. 9. The apparatus 100 is thereby configured to deflect rainwater falling onto the canopy 128 away from the apparatus 100.

Figure 10:
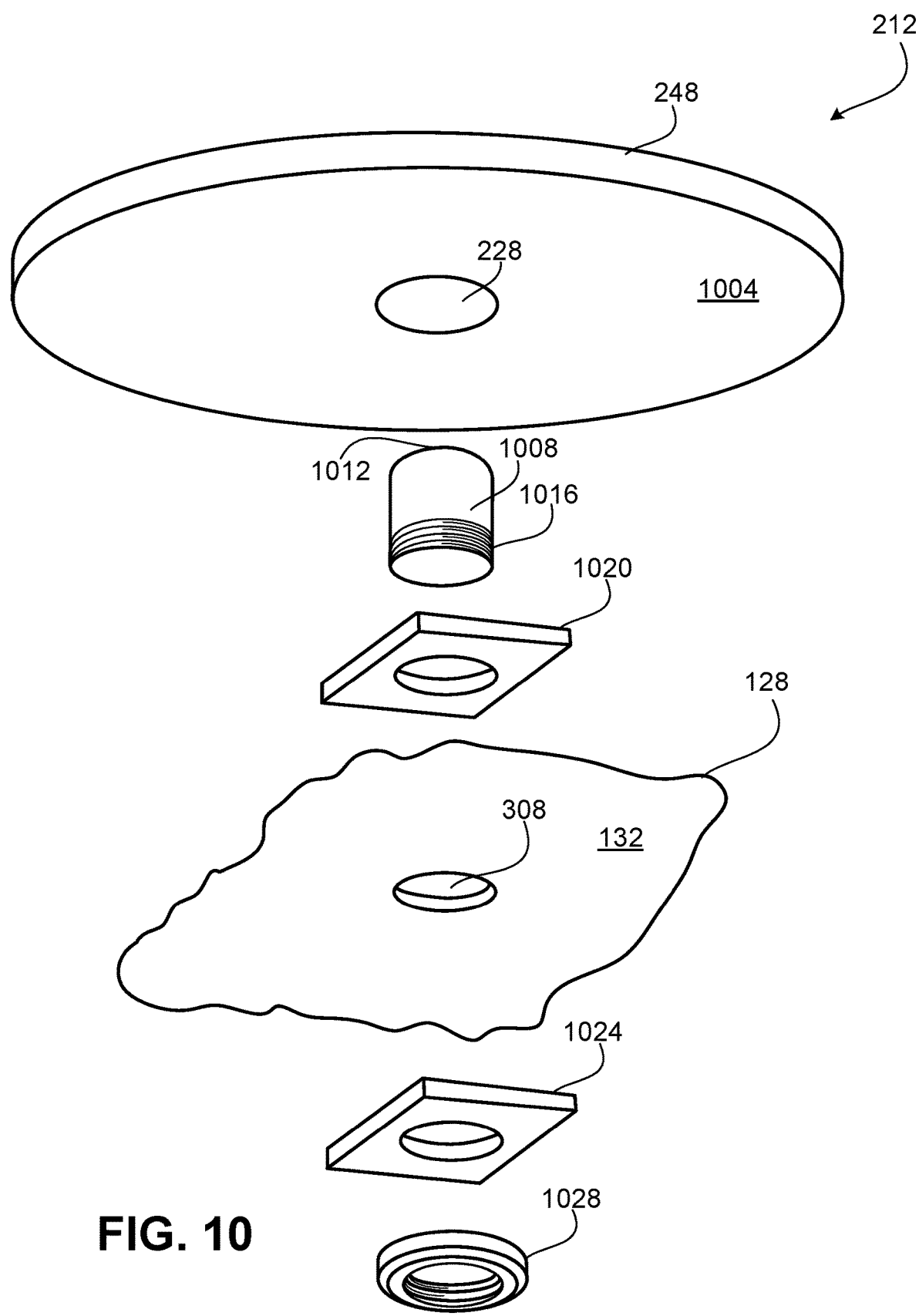
FIG. 10 shows a perspective view of components of the apparatus, in accordance with one or more embodiments.

FIG. 10 shows a perspective view of components of the apparatus 100, in accordance with one or more embodiments. The assembled apparatus 100, as shown in FIG. 1, includes at least some of the components shown in FIG. 10. The components include the second planar panel 248. The second planar panel 248 is illustrated and described in more detail with reference to FIG. 2. The second planar panel 248 defines an opening 228 located proximal to a center of the second planar panel 248. Water (for example, rainwater) can flow through the opening 228 when the apparatus 100 is placed in the rainwater-harvesting configuration. The second planar panel 248 is secured to the first planar panel 232 by connectors 244 and positioned parallel to the first planar panel 232 (not shown in FIG. 10).

In some embodiments, the apparatus 100 includes a drainpipe section 1008. A top circumference of the drainpipe section 1008 is secured level with a surface 1004 of the second planar panel 248 distal to the first planar panel 232. The drainpipe section 1008 can be shaped as a circular cylinder, an elliptic cylinder, a rectangular cuboid, or a hexagonal cylinder. The drainpipe section 1008 defines a mouth 1012 that is aligned with the opening 228 defined by the second planar panel 248. The mouth 1012 can have a circular, square, oval, rectangular, or hexagonal shape. The shape of the mouth 1012 matches the shape of the opening 228. The drainpipe section 1008 is inserted through a perforation 308 in the canopy 128, such that rainwater falling on to the apparatus 100 can flow through the opening 228 defined by the second planar panel, the perforation 308, and the mouth 1012 defined by the drainpipe section 1008 in the rainwater-harvesting mode. The perforation 308 is located within the segment 132 of the canopy 128.

The components illustrated in FIG. 10 include a pair of gaskets 1020, 1024 positioned on either side of the segment 132 of the canopy 128. The gaskets 1020, 1024 are configured to protect the segment 132 of the canopy 128. The pair of gaskets 1020, 1024 are thus positioned on the underside 212 of the planar panel assembly 116, when the apparatus 100 is assembled. The underside 212 of the planar panel assembly 116 is illustrated and described in more detail with reference to FIG. 2.

The components of the apparatus 100 further include a locknut 1028 configured to be tightened about a threaded portion 1016 of the drainpipe section 1008 distal to the second planar panel 248. The threads of the threaded portion 1016 of the drainpipe section 1008 are on the outside of the drainpipe section 1008. The threads of the threaded portion 1016 of the drainpipe section 1008 match the threads of the locknut 1028. The locknut 1028 can be hand-tightened on the threaded portion 1016 of the drainpipe section 1008, forcing the segment 132 of the canopy 128 against the underside 212 of the planar panel assembly 116. The underside 212 of the planar panel assembly 116 is shown in FIG. 2. The locknut 1028 is further configured to secure the pair of gaskets 1020, 1024 and the segment 132 of the canopy 128 to the planar panel assembly 116. The segment 132 of the canopy 128 is thus sandwiched between the pair of gaskets 1020, 1024. When the apparatus 100 is disassembled, the components shown in FIG. 10 are separated from each other, allowing the segment 132 to be folded flat, such that the components of the apparatus 100 can be transported (for example, by backpack).

Figure 11:
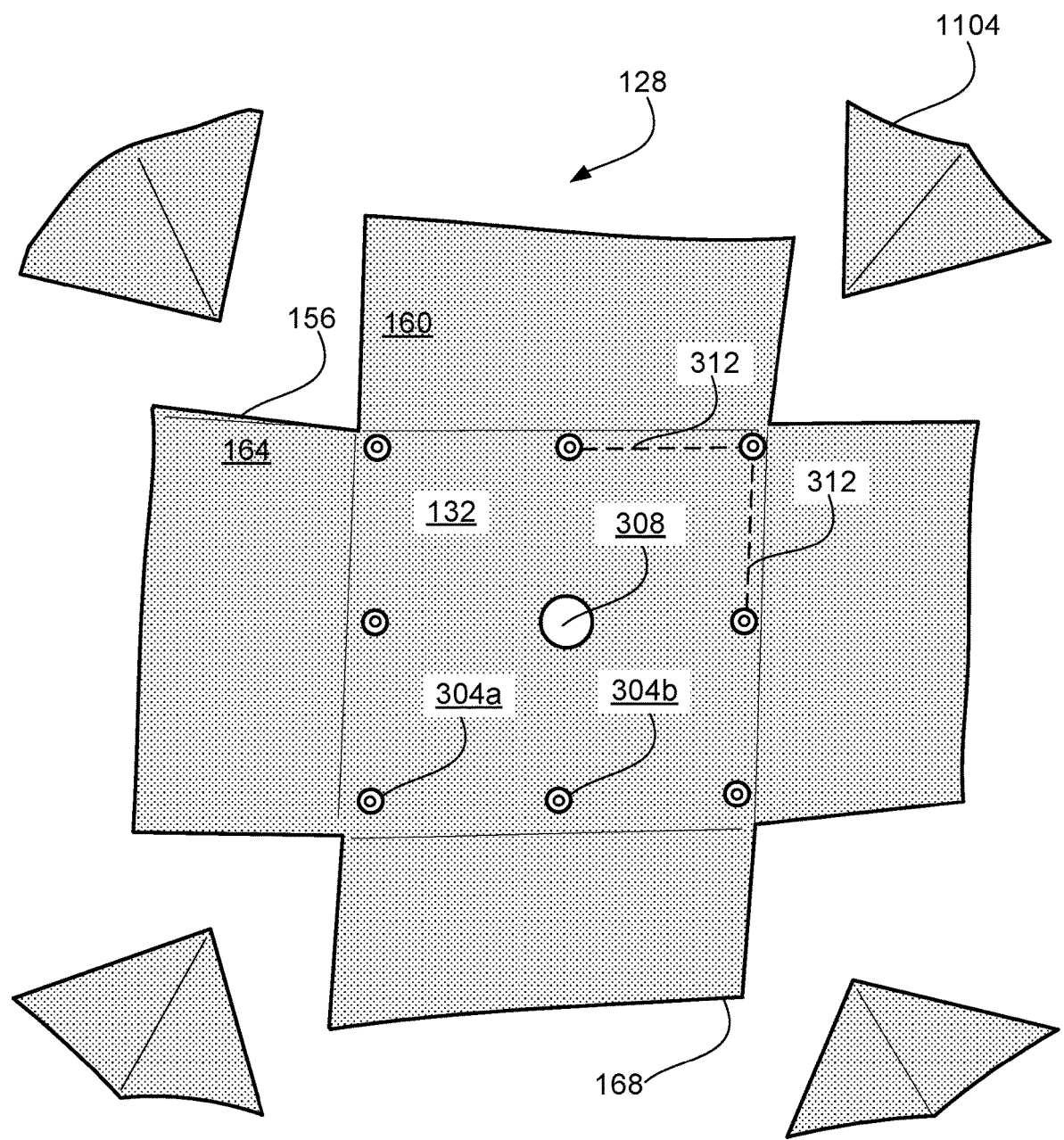
FIG. 11 shows a planar view of the canopy, in accordance with one or more embodiments.

FIG. 11 shows a planar view of the canopy 128, in accordance with one or more embodiments. The canopy 128 is secured to the planar panel assembly 116 (illustrated and described in more detail with reference to FIG. 2), such that a segment 132 of the canopy 128 moves together with the planar panel assembly 116. Multiple grommets 304 are inlaid in the canopy 128. The grommets 304 are arranged in a polygonal formation to surround the perforation 308 in the center of the canopy 128. Each grommet 304a is spaced apart from each other grommet 304b, such that the grommets 304 are inlaid in the canopy 128 on a periphery 312 of the polygonal formation.

The poles 604 (illustrated and described in more detail with reference to FIG. 6) of the apparatus 100 have threaded extensions that are inserted through the grommets 304 to support the canopy 128 when the apparatus 100 is assembled. The drainpipe section 1008 (illustrated and described in more detail with reference to FIG. 10) is inserted through the perforation 308 in the canopy 128, such that rainwater falling on to the apparatus 100 can flow through the perforation 308 and the drainpipe section 1008 when the apparatus 100 is placed in the rainwater-harvesting configuration.

One or more zippers 156 are secured to at least one section 160 of the canopy 128. The one or more zippers 156 are operable to fasten the at least one section 160 of the canopy 128 to at least one other section 164 of the canopy 128. In such a manner, an opening or space between the sections 160, 164 can be sealed and the material of the canopy 128 appears neater and not bunched up between the sections 160, 164. Portions 1104 of the corners of the canopy 128 can be cut off and discarded in the manufacturing process to allow the one or more zippers 156 to align with each other and with the sections 160, 164.

Figure 12:
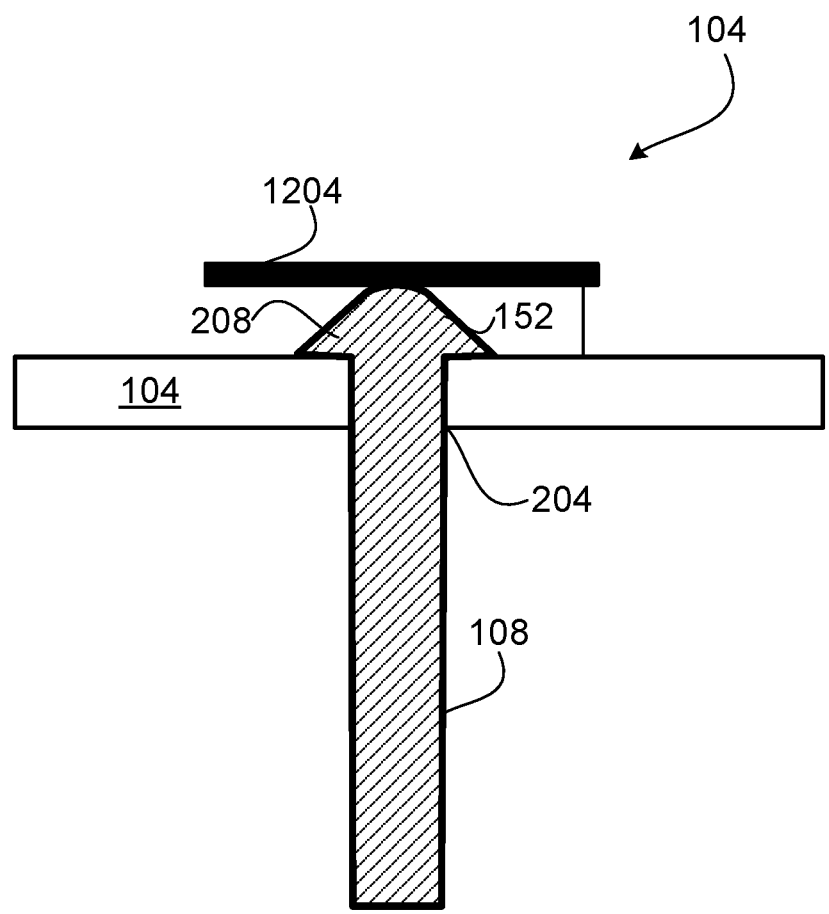
FIG. 12 shows a perspective view of a platform, in accordance with one or more embodiments.

FIG. 12 shows a perspective view of a platform 104, in accordance with one or more embodiments. The platform 104 defines the unthreaded aperture 204, illustrated and described in more detail with reference to FIG. 2. The unthreaded aperture 204 can be round, oval, square, or another polygonal shape. In some embodiments, the apparatus 100 (illustrated and described in more detail with reference to FIG. 1) includes a hasp 1204 secured to the platform 104. The hasp 1204 is configured to secure a first end 208 (illustrated and described in more detail with reference to FIG. 2) of the threaded fastener 108 to the platform 104. The first threaded fastener end 208 is proximal to the platform 104. The threaded fastener 108 is thus supported by the platform 104 at the first threaded fastener end 208. The hasp 1204 holds the protuberance 152 of the threaded fastener 108 down onto the platform 104 as the threaded fastener 108 is rotated. In some embodiments, the protuberance 152 or bolt head is held down on the platform 104 by the hasp 1204, allowing the fastener 108 to pivot freely under the hasp 1204 and within the unthreaded aperture 204 through the platform 104 to rest against the platform 104. For example, the metal hasp slides over the protuberance 152 of the threaded fastener 108, preventing vertical movement but allowing rotation in the unthreaded aperture 204 of the platform 104.

Figure 13A:
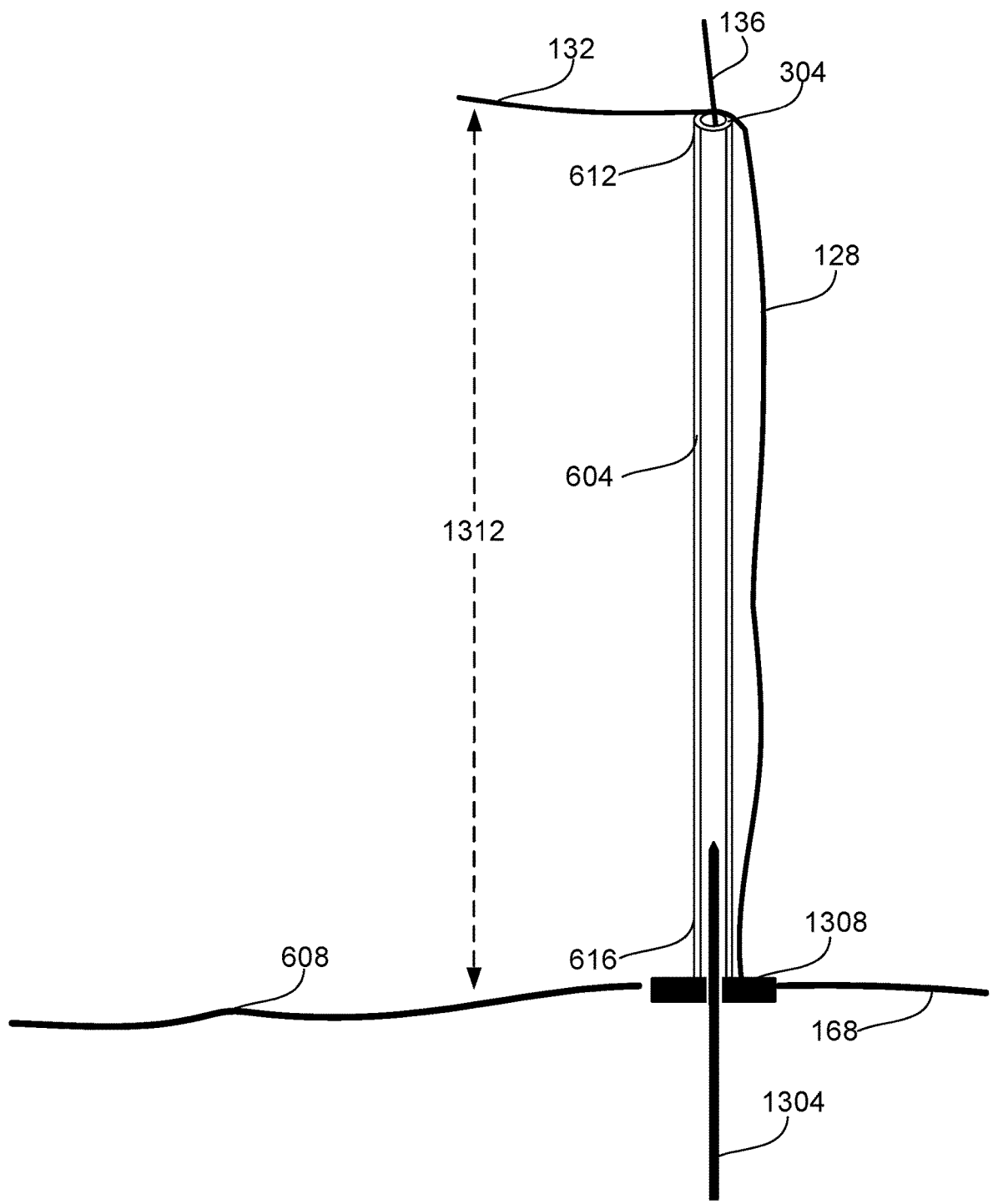
FIG. 13A shows a side view of a pole, in accordance with one or more embodiments.

FIG. 13A shows a side view of a pole 604, in accordance with one or more embodiments. Multiple poles 604 are used to support the canopy 128. A first end 612 of each pole 604 has a threaded extension that is inserted through a grommet 304 inlaid in the canopy 128 to support the canopy 128. The canopy 128 is secured to a planar panel assembly 116 (illustrated and described in more detail with reference to FIG. 1), such that a segment 132 of the canopy 128 moves together with the planar panel assembly 116 to harvest or deflect rainwater falling on to the canopy 128.

In some embodiments, the apparatus 100 (illustrated and described in more detail with reference to FIG. 1) includes a groundsheet 608. A second end 616 of each pole 604 distal to the first pole end 612 is secured to the groundsheet 608 such that the groundsheet 608 is laterally stretched. Each pole 604 telescopes to vary a distance 1312 between the canopy 128 and the groundsheet 608. Each of the canopy 128 and the groundsheet 608 are made of at least one of waterproofed fabric, plastic, or canvas. In some embodiments, a second end 616 of each pole 604 has a rod 1304 configured to anchor the pole 604 to the ground when the apparatus 100 is assembled. The rod 1304 is sometimes referred to as an "anchor rod." In some embodiments, the rod is in a range from 33-39 inches long and ⅝ inches in diameter. In some embodiments, the apparatus 100 further includes multiple skirt locks 1308 configured to secure an edge 168 of the canopy 128 to the multiple poles 604.

Figure 13B:
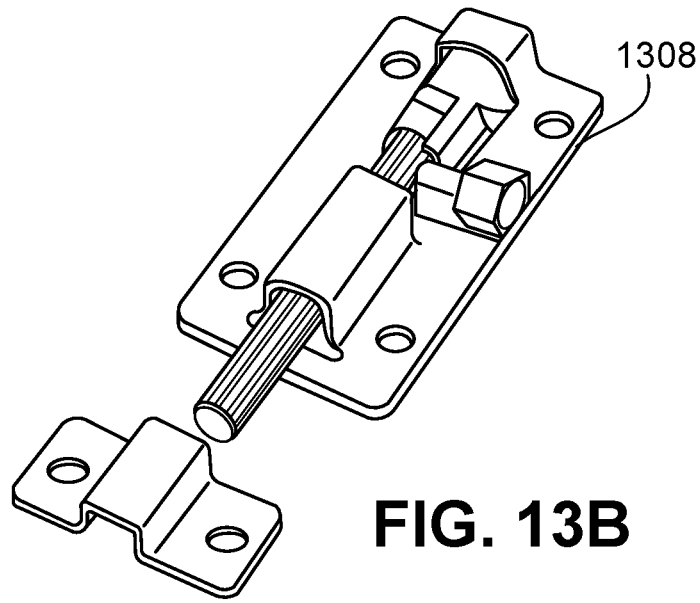
FIG. 13B shows a side view of a skirt lock, in accordance with one or more embodiments.

FIG. 13B shows a side view of a skirt lock 1308, in accordance with one or more embodiments. As illustrated and described in more detail with reference to FIG. 13A, a second end 616 of each pole 604 has a rod 1304 configured to anchor the pole 604 in some embodiments. In some embodiments, multiple skirt locks 1308 are configured to secure an edge 168 of the canopy 128 to the poles 604. The second pole end 616, pole 604, rod 1304, edge 168, and canopy 128 are illustrated and described in more detail with reference to FIG. 13A. The skirt lock 1308 is sometimes referred to as a "deadbolt slide lock."

Figure 14:
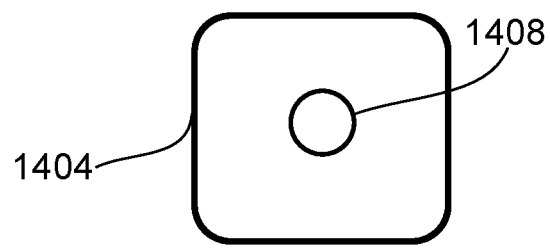
FIG. 14 shows a planar view of a platform, in accordance with one or more embodiments.

FIG. 14B shows a planar view of a platform 1404, in accordance with one or more embodiments. The platform 1404 is sometimes referred to as a "footer platform." In some embodiments, the platform 1404 has a square or rectangular shape, and each side of the platform 1404 has a length in a range from 6-12 inches. The platform 1404 defines a circular or elliptical hole located proximal to a center of the platform 1404. The hole defined by the platform 1404 has a diameter in a range from 0.5-2 inches. The platform 1404 is placed on the ground. The skirt locks 1308 (illustrated and described in more detail with reference to FIG. 13B) can be mounted on the platform 1404 at a base of each pole 604 proximal to the second end 616 of the pole 604. The second end 616 of the pole 604 is illustrated and described in more detail with reference to FIG. 13A. In some embodiments, the skirt locks 1308 include sliding deadbolts that can be inserted through grommets located along the edge 168 of the canopy 128. The edge 168 of the canopy 128 is illustrated and described in more detail with reference to FIG. 13A. The deadbolts can be inserted to a depth of ¼ inches into holes cut into the poles 604. Each pole 604 can be positioned snugly over the rod 1304 (illustrated and described in more detail with reference to FIG. 13A), such that the pole 604 stands atop the platform 1404. In some embodiments, the skirt locks 1308 hold the canopy 128 down tautly as a resilient wall.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the disclosed embodiments, and what is intended by the applicants to be the scope of the disclosed embodiments, is the literal and equivalent scope of the set of claims that issue from this application, in the specific form in which such claims issue, including any subsequent correction. Any definitions set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. An apparatus comprising:
   a platform defining an aperture;
   a threaded fastener inserted through the aperture and rotatable through the aperture;
   a planar panel assembly fastened to the platform by the threaded fastener, the planar panel assembly configured to move along a longitudinal axis of the threaded fastener towards or away from the platform as the threaded fastener is rotated through the aperture in the platform;
   a canopy secured to the planar panel assembly, such that a segment of the canopy moves together with the planar panel assembly along the longitudinal axis of the threaded fastener as the planar panel assembly moves towards or away from the platform;
   a plurality of poles supporting the canopy, a first end of each pole of the plurality of poles secured to the canopy; and
   a plurality of struts supported in a pyramidal arrangement by the plurality of poles, a first end of each strut of the plurality of struts secured to the first pole end of a respective pole of the plurality of poles.

2. The apparatus of claim 1, further comprising a plurality of straps, each strap of the plurality of straps securing a second end of a respective strut of the plurality of struts to the platform, the second strut end distal to the first strut end, the plurality of straps made from at least one of nylon, fabric, plastic, or hemp.

3. The apparatus of claim 1, wherein each strut of the plurality of struts defines a hole located proximal to the first strut end of the strut, and wherein the first pole end of each pole of the plurality of poles has a threaded extension inserted through the hole defined by a respective strut.

4. The apparatus of claim 1, wherein the planar panel assembly comprises:
a first planar panel positioned parallel to the platform, the first planar panel defining a threaded hole, the threaded fastener secured to the first planar panel through the threaded hole defined by the first planar panel; and
a plurality of connectors secured to a surface of the first planar panel distal to the platform.

5. The apparatus of claim 4, wherein the planar panel assembly further comprises a second planar panel secured to the first planar panel by the plurality of connectors and positioned parallel to the first planar panel, the first planar panel positioned between the platform and the second planar panel, the second planar panel defining an opening.

6. The apparatus of claim 5, wherein each of the platform, the first planar panel, and the second planar panel is made of at least one of metal, wood, rubber, or engineering plastic and wherein the plurality of connectors is made of at least one of metal, wood, rubber, or engineering plastic.

7. The apparatus of claim 5, further comprising a drainpipe section secured to a surface of the second planar panel distal to the first planar panel, the drainpipe section defining a mouth aligned with the opening defined by the second planar panel.

8. The apparatus of claim 7, wherein the drainpipe section is inserted through a perforation in the canopy, the planar panel assembly further configured to allow rainwater falling on to the apparatus to flow through the opening defined by the second planar panel, the perforation, and the mouth defined by the drainpipe section.

9. The apparatus of claim 7, further comprising a pair of gaskets positioned on either side of the segment of the canopy and configured to protect the segment of the canopy.

10. The apparatus of claim 9, further comprising a locknut configured to be tightened about a threaded portion of the drainpipe section distal to the second planar panel, the locknut configured to secure the pair of gaskets and the segment of the canopy to the planar panel assembly.

11. The apparatus of claim 1, wherein the canopy is supported by the planar panel assembly in a pyramidal arrangement, the apparatus configured to deflect rainwater falling onto the canopy.

12. The apparatus of claim 1, wherein the planar panel assembly is further configured to place the canopy in a funnel-shaped arrangement, the apparatus configured to allow rainwater falling onto the canopy to flow into the apparatus.

13. The apparatus of claim 1, further comprising a hasp secured to the platform, the hasp configured to secure a first end of the threaded fastener to the platform, the first threaded fastener end proximal to the platform, the threaded fastener supported by the platform at the first threaded fastener end.

14. The apparatus of claim 1, wherein the threaded fastener has a protuberance disposed on a first end of the threaded fastener, the protuberance having at least one dimension larger than a diameter of the aperture in the platform, the protuberance configured to rest against the platform.

15. The apparatus of claim 14, further comprising a pin inserted through a second end of the threaded fastener distal to the first threaded fastener end, the pin configured to be rotated around the longitudinal axis of the threaded fastener to rotate the threaded fastener through the aperture in the platform.

16. An apparatus comprising:
a platform defining an aperture;
a threaded fastener inserted through the aperture and rotatable through the aperture;
a planar panel assembly fastened to the platform by the threaded fastener, the planar panel assembly configured to move along a longitudinal axis of the threaded fastener towards or away from the platform as the threaded fastener is rotated through the aperture in the platform;
a canopy secured to the planar panel assembly, such that a segment of the canopy moves together with the planar panel assembly along the longitudinal axis of the threaded fastener as the planar panel assembly moves towards or away from the platform;
a plurality of poles supporting the canopy, a first end of each pole of the plurality of poles secured to the canopy; and
a plurality of grommets inlaid in the canopy, the first pole end of each pole of the plurality of poles having a threaded extension inserted through a respective grommet of the plurality of grommets.

17. An apparatus comprising:
a platform defining an aperture;
a threaded fastener inserted through the aperture and rotatable through the aperture;
a planar panel assembly fastened to the platform by the threaded fastener, the planar panel assembly configured to move along a longitudinal axis of the threaded fastener towards or away from the platform as the threaded fastener is rotated through the aperture in the platform;
a canopy secured to the planar panel assembly, such that a segment of the canopy moves together with the planar panel assembly along the longitudinal axis of the threaded fastener as the planar panel assembly moves towards or away from the platform;
a plurality of poles supporting the canopy, a first end of each pole of the plurality of poles secured to the canopy; and
a groundsheet, a second end of each pole distal to the first pole end secured to the groundsheet such that the groundsheet is laterally stretched, wherein each pole of the plurality of poles telescopes to vary a distance between the canopy and the groundsheet, and wherein each of the canopy and the groundsheet made of at least one of waterproofed fabric, plastic, or canvas.

18. The apparatus of claim 17, wherein the second pole end of each pole of the plurality of poles has a rod configured to anchor the pole, the apparatus further comprising a plurality of skirt locks configured to secure an edge of the canopy to the plurality of poles.

* * * * *